July 9, 1946.  S. W. SEELEY  2,403,559

SUB-SYNCHRONOUS RECTIFIER FOR FREQUENCY DIVISION

Filed Dec. 24, 1943    2 Sheets-Sheet 1

INVENTOR
STUART W. SEELEY.
BY H. S. Grover
ATTORNEY

INVENTOR
STUART W. SEELEY
BY H. S. Grover
ATTORNEY

Patented July 9, 1946

2,403,559

UNITED STATES PATENT OFFICE 2,403,559

SUBSYNCHRONOUS RECTIFIER FOR FREQUENCY DIVISION

Stuart W. Seeley, Roslyn, N. Y., assignor to Radio Corporation of America, a corporation of Delaware Application December 24, 1943, Serial No. 515,480

12 Claims. (Cl. 172—281)

This application discloses a means for deriving from, or producing by means of, wave energy of a first frequency other wave energy the frequency of which is a fractional part of said first frequency.

The general object of my invention is improved means for deriving from wave energy oscillatory energy the frequency of which is a fraction of the frequency of the said wave energy.

An additional object of this invention is the provision of a simple method and circuit means for producing oscillatory energy of a frequency which is a fraction of the frequency of other oscillatory energy of sine wave form, which circuits are more stable in operation than circuits used heretofore for this same purpose.

An additional object of my invention is to provide means for dividing the frequency of wave energy by a factor equal to one or greater, such as, for example, by a factor of 1, 1½, 2, 2½, etc.

Figure 4:
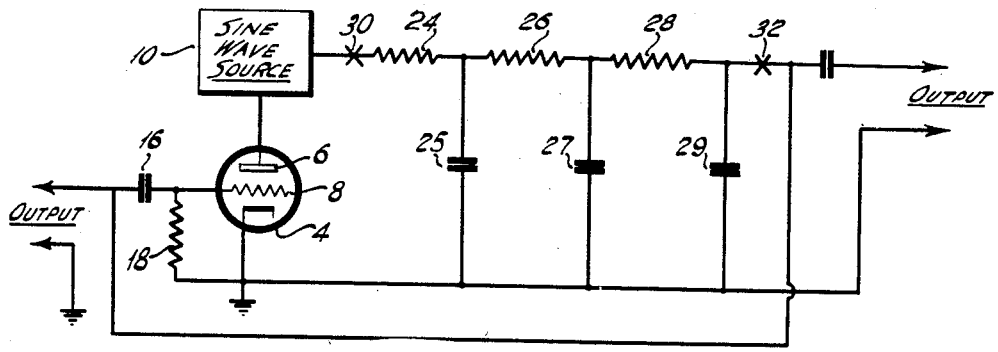
Figure 5:
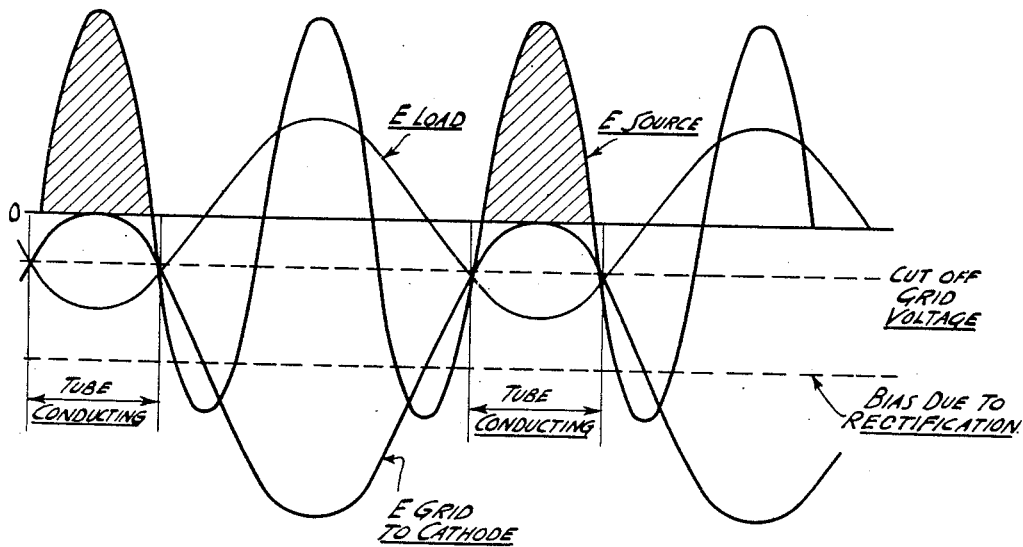

In describing my invention in detail reference will be made to the attached drawings wherein Figs. 1 to 4, inclusive, each illustrate an embodiment of my sub-synchronous frequency divider, and Fig. 5 illustrates by voltage curves operation of the systems in the several modifications.

My system consists of what I have chosen to call a "sub-synchronous rectifier" so constituted that the said rectifier is allowed to conduct only at sub-multiple periods of the applied wave frequency, the frequency of which is to be divided.

Figure 1:
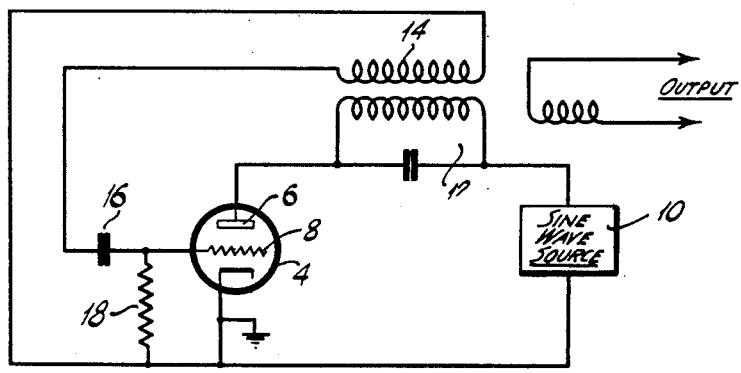

In its simplest form, the rectifier takes the characteristic of a three-electrode tube such as illustrated diagrammatically at 4 in Fig. 1, with the initial frequency to be divided designated as a source 10, applied between the anode 6 and cathode, with a load circuit 12 interposed in series in these connections. For the purpose of obtaining the sub-synchronous periodic action, the load circuit 12 in this simplified form of my device is tuned to the desired sub-multiple output frequency. The grid electrode 8 of the tube 4 is coupled by inductance 14 and grid condenser 16 to this load 12, so that the grid is supplied with potentials at the sub-multiple frequency in phase opposition with respect to the potentials at the anode 6 of the tube 4 at this sub-multiple frequency.

As shown, the grid 8 is inductively coupled to the tuned load circuit 12 by the inductance 14 connected between the grid 8 and cathode by coupling condenser 16. The grid condenser 16 and grid lead 18 are so dimensioned that due to grid rectification, application of potentials of the load or output frequency to the grid 8 of a magnitude several times greater than the potential necessary to block conduction in the tube at the highest peak plate voltage of the applied frequency to be divided, allows the triode to conduct only through relatively small angles of the output frequency and through not more than 540° of the applied or source frequency. As an example, assume the source 10 is of 10,000 cycles per second with a peak potential of 100 volts, and the same is applied between the anode 6 and cathode, and that the circuit 12 is tuned to 1,000 cycles per second. The secondary winding 14 coupled to the tuned circuit supplies sufficiently high potentials to the grid 8 of the triode type tube 4, so that the rectifier action of the grid 8 together with the grid leak 18 and grid condenser 16 allows the tube to be in the conducting state through say 18° at the peak of the 1,000 cycle frequency. Note that for this operation no steady B voltage supply is necessary. The fact that the grid of the triode allows conduction through only 18° of the 1,000 cycle frequency means that the tube will conduct for 180° at the 10,000 cycle frequency each tenth cycle. Thus power is supplied to the load circuit with a strong 1,000 cycle component and resonance of this circuit causes large 1,000 cycle voltages to appear across the load circuit. Voltages of this fractional frequency may be supplied to any utilization means coupled to the output circuit.

At the start of operation assume zero potential on all three electrodes of the tube 4. The triode will now be conductive for the first positive swing of the synchronous voltage of 10,000 cycles applied to the anode from source 10. This first positive swing then causes a surge of current to flow through the load circuit 12, tuned to 1,000 cycles, which starts to oscillate and supplies the grid 8 with voltages of 1,000 cycles per second. The grid 8, however, because of the grid condenser 16 and grid leak 18 and rectification due to the conducting effect of the grid cannot swing positive but rather builds up an average negative bias which together with the alternating voltage at the load frequency, i. e., 1,000 cycles, only comes up positive enough to allow the tube to conduct during the aforementioned small angle, i. e., 18° of the fractional frequency.

As another example, and in order to simplify illustration, assume that the source 10 is of 10,000 cycles and the load circuit 12 is tuned to 5,000 cycles, so that the factor of division is 2. The anode of the tube therefore has applied thereto a 10,000 cycle voltage, E source, as illustrated in Fig. 5. The tube grid 8 has applied thereto a grid to cathode voltage, E grid, of 5,000 cycle frequency during operation due to the coupling 12 to 14 described hereinbefore. This voltage is 180° out of phase with respect to the load circuit voltage, E load, on the plate of the tube and due to grid rectification builds up a negative bias to make the tube non-conductive until the voltage of the fractional frequency, E grid, in Fig. 5 set up across 12, as described above, induced in 14 and applied to the grid overcomes this bias to make the tube conductive on alternate positive peaks of the 10,000 cycle applied plate voltage. Note that in this example given, the tube is conductive during about half a cycle of the synchronizing frequency (10,000 cycles) and during about 90° of the fractional frequency (5,000 cycles). Note further that since the voltage, E source, is negative on both sides of this positive peak, where the tube is conductive, the tube is conductive through an angle of not more than 540° of the applied synchronizing frequency.

The factor of division may be a whole number such as 1, 2, 3, etc., or a fraction such as 1½, 2½, etc., provided the principle outlined above is followed. It is essential that the grid be supplied with voltage of the load frequency in phase opposition with respect to the voltage of the load frequency on the anode. Moreover, the magnitude of this grid voltage is to be such that with a grid leak and condenser of the proper value, by virtue of grid rectification an average negative bias is built up on the grid which is overcome only by peak values of the grid voltage of the load frequency thereby allowing the tube to conduct only during a small angle of the peaks of the load frequency voltage. A further essential is that the peaks of the load frequency voltage on the grid which overcome the grid bias occur when the voltage from the source 10 on the plate is positive.

Figure 2:
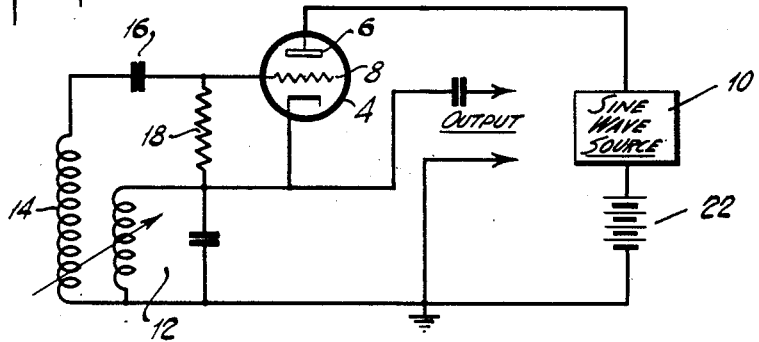

In the modification of Fig. 2, the circuit 12 is between the cathode and ground and the inductance 14 is so dimensioned as to apply to the grid 8 with respect to the cathode an alternating current voltage having a value such as to cause operation as described above. The grid voltage and the values of resistance 18 and condenser 16 are again such that by grid rectification steady state negative bias is built up on grid 8 which is overcome only by peaks of the voltages of load frequency on the grid 8. In this modification of Fig. 2 a direct current source 22 may be included in the anode circuit with the sine wave source 10 to improve operation of the system.

Figure 3:
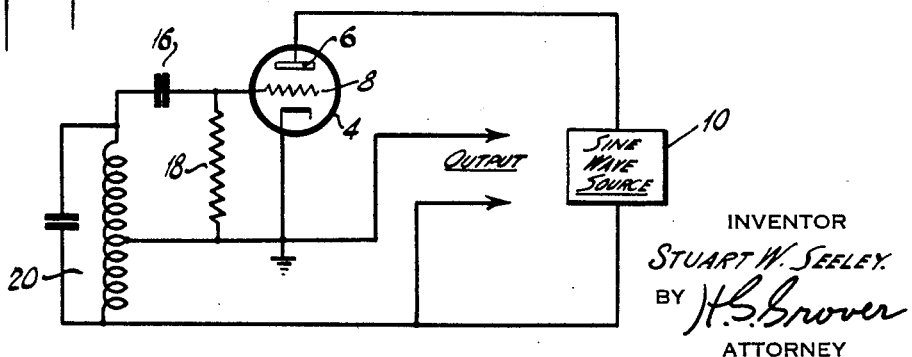

In the modification of Fig. 3 only part of the resonant load circuit 20 is included in the cathode circuit. The remainder of the tuned load circuit is used to supply the grid-to-cathode potentials at the output frequency. The operation of this arrangement is essentially as described above. Here the tap to the cathode on the inductance of 20 is such that the grid 8 has applied thereto a voltage, E grid, of the fractional frequency strong enough to overcome at its peaks the steady negative bias built up by condenser 16 and resistance 18 on grid 8 due to grid rectification.

In the prior modifications I have described the operation of my system wherein an inductive and capacitive resonant load circuit 12 is used to develop oscillations of the fractional frequency and supply the same to the grid. I have also found that combinations of resistance and capacity will also produce the necessary 180° phase shift between the potentials across the load and those applied to the grid at the output frequency so that no inductance need be used in the circuits.

The advantage of the use of RC circuits rather than LC circuits will be apparent to those skilled in the art.

A modification of the RC type mentioned in the preceding paragraph has been shown in Fig. 4. In this embodiment the sine wave source 10 is connected to the anode 6 and to a plurality of series resistors 24, 26 and 28, and shunting condensers 25, 27 and 29, with the lower terminals of the condensers 25, 27 and 29 connected to the cathode and a point at the end of the series resistances connected to the control grid through condenser 16. The resistors 24, 26 and 28 and condensers 25, 27 and 29 are chosen of such values that they produce a 180° phase shift, between the voltages appearing between the point 30 and ground and the voltages appearing between the point 32 and ground, at the desired sub-multiple or sub-fractional frequency of the synchronizing voltage frequency introduced at 10. This resistance and condenser network has an added advantage in that it tends to keep a large portion of the voltages of the frequency applied at 10 from being impressed on the grid 8 of the tube 4, which in this embodiment is preferably a high mu triode.

The operation of the system illustrated in Fig. 4 is as follows, for one cycle of the voltage applied at 10, the plate 6 conducts and current flows through the triode and through the resistor condenser load circuit 24 to 29. This surge of current eventually produces a negative voltage on the grid 8 and causes the triode to be non-conductive for several cycles of the applied frequency of source 10, then after an interval determined by the value of the resistors 24, 26 and 28 and condensers 25, 27 and 29 the grid is again brought to zero potential by the applied voltage of fractional frequency and allows the process to be repeated. The potential between the point 32 and ground is practically a pure sine wave at the output or fractional frequency due to the filtering action of the resistive capacity network 24 to 29, and said sine wave frequency is a true sub-multiple of the frequency applied at 10.

The operation of the modification illustrated in Fig. 4 is the same in general as the operation of the prior modifications. The arrangement is such that the grid is supplied with alternating current of the output frequency in proper phase and amount to allow the tube to conduct only at proper intervals.

The values of the circuit elements in the various modifications depend on the frequency of the source 10 and the factor of division desired. In an embodiment of my sub-synchronous rectifier divider illustrated in Fig. 3 the source 10 is 10,000 cycles per second, and the desired output is 1000 cycles per second. The circuit 20 is tuned to resonance at 1000 cycles per second. Condenser 16 is .05 μfds, resistance 18 is 100,000 ohms, while the tube 4 is a type of 6SF5 high mu triode.

I claim:

1. In apparatus for deriving alternating voltages the frequency of which is a fraction of the frequency of the voltage of a source of alternating voltage, an electron discharge tube rectifier having electrodes including an anode and a cathode between which a discharge may take place, an excitation circuit including said source of alternating voltage in a path with said electrodes between which said discharge takes place, a direct current biasing circuit for an electrode of said tube for applying thereto a bias such that said tube is operated at cutoff with respect to excitation voltages of the frequency of said source, and a circuit selectively responsive to voltages of the desired fractional frequency coupled with said biasing circuit for applying to said tube alternating current of the desired fractional frequency and of a magnitude which overcomes said cutoff bias on peaks of said applied voltages of said fractional frequency.

2. In apparatus for deriving alternating voltage the frequency of which is a fraction of the frequency of the voltage of a source of alternating voltage, a discharge tube rectifier having a discharge path and a control grid, a circuit including said source in series with the discharge path through said tube, a circuit selectively responsive to the desired fractional frequency, connections connecting a part at least of said last named circuit in series with said discharge path, whereby alternating voltage of the desired fractional frequency is developed in said last named circuit, a direct current biasing circuit for the control grid of said tube for biasing the same beyond cutoff with respect to peak voltages of the frequency of said source, and a coupling between said selectively responsive circuit and said control grid for applying to said control grid alternating voltage of said fractional frequency and of a magnitude sufficient to overcome said bias and permit said tube to conduct during a portion at least of the positive cycle of the alternating voltage applied to said control grid.

3. In a frequency divider, a source of alternating voltage, a discharge tube having an anode, a cathode, and a control grid, a circuit including said source in series between the anode and cathode of said tube, a circuit selectively responsive to the desired fractional frequency, connections including a part at least of said last named circuit in said first circuit, a coupling between the control grid of said tube and said selectively responsive circuit to apply to the control grid a voltage of said fractional frequency, a direct current biasing circuit including a resistance and a condenser connected to the control grid and cathode of said tube and operating by grid rectification to build up on said grid an average negative bias which is overcome only by peak voltages of said fractional frequency and connections for selecting as the output of said divider electrical energy having a component of said fractional frequency.

4. In a frequency divider, a source of alternating voltage of sine wave form, an electron discharge tube having an anode, a cathode, and a control grid, a circuit including said source in series with the anode and cathode of said tube, a circuit parallel tuned to the desired frequency which may be a fractional of the frequency of said source, connections including a part at least of said parallel tuned circuit in the discharge path of said tube, whereby voltages of said fractional frequency are developed across said parallel tuned circuit during operation, a coupling between said tuned circuit and the control grid of said tube, and a direct current biasing circuit including a condenser and resistance connected to the control grid and cathode of said tube and operating by grid rectification to build up on said grid an average negative bias which is overcome only during the positive cycles of said voltages of said fractional frequency fed by said coupling from said parallel tuned circuit to said control grid.

5. In a frequency divider a source of alternating voltage of sine wave form, a discharge tube having an anode, a cathode, and a control grid, a circuit parallel tuned to a frequency which is a fraction of the frequency of said source, connections including said source of voltage, and said parallel tuned circuit in series between the anode and cathode of said tube whereby voltage of the frequency of said source is impressed on the anode of said tube and voltage of said fractional frequency is developed across said parallel tuned circuit during operation, a coupling between said parallel tuned circuit and the control grid of said tube for applying voltage of said fractional frequency to the control grid, a condenser and a grid leak resistance in a biasing circuit connected to the control grid and cathode of said tube for applying thereto due to grid rectification a bias such that said tube is cut off with respect to plate voltages of the frequency of said source but is conductive in the presence of positive peaks of the voltage of fractional frequency on the control grid to produce in said tube currents having a strong component at said fractional frequency, and output connections from which voltages of said fractional frequency may be selected.

6. In electrical apparatus a source of alternating voltage of sine wave form, an electron discharge tube having an anode, a cathode, and a control grid, an inductance and capacity in parallel tuned to a frequency which is a fraction of the frequency of said source, connections including said source in series between the anode and cathode of said tube, an inductance coupled between the control grid and cathode of said tube and coupled to the inductance of said parallel tuned circuit, to apply to the control grid during operation voltages of said fractional frequency developed in said parallel tuned circuit, a direct current biasing circuit including a resistance between the control grid and cathode of said tube operating by grid rectification to build up on said grid an average negative bias which is overcome only by peak voltages of said fractional frequency to produce in said tube currents having a component of said fractional frequency and output connections to said tube.

7. In apparatus for deriving alternating current voltages the frequency of which is a fraction of the frequency of a source of voltages to be divided, a discharge tube having an anode, a cathode, and a control grid, a circuit including said source between the anode and cathode of said tube, a circuit selectively responsive to the desired fractional frequency coupling said anode to the control grid of said tube to apply thereto during operation voltages of said fractional frequency, and of a phase opposite to the phase of the voltages of said fractional frequency on the anode of said tube, and a direct current biasing circuit connected to the control grid and cathode of said tube and operating by grid rectification to build up on said grid an average negative bias which is overcome only by peak voltages of said fractional frequency to produce in said tube currents having a component of said fractional frequency.

8. In a frequency divider, a source of alternating voltages of a first frequency, an inductance and capacity in parallel tuned to a second frequency which is a fraction of said first frequency, a discharge tube having an anode, a cathode, and a control grid, connections including said parallel tuned inductance and capacity and said source between the anode and control grid of said tube, a coupling between a point on said inductance and the cathode of said tube, the arrangement being such as to apply between the control grid and anode of said tube during operation voltages of said fractional frequency and of opposite phase, and a biasing resistance connected between the control grid and cathode of said tube and opertaing by grid rectification to build up on said grid an average negative bias which is overcome only by peak voltages of said fractional frequency to produce in said tube currents having a component of said fractional frequency.

9. In electrical apparatus, a source of alternating voltage of a first frequency, a discharge tube having an anode, a cathode, and a control grid, a resistive and capacitive network connecting said source in series between the anode and cathode of said tube, said network being dimensioned to provide between its anode end and a second point thereon a phase reversal of voltages of a frequency which is a desired fraction of said first frequency, a coupling between said second point on said network and the control grid of said tube to apply thereto said voltage of said fractional frequency, a direct current biasing circuit connected to the control grid and cathode of said tube and operating by grid rectification to build up on said grid an average negative bias which is overcome only during positive swings of said voltage of fractional frequency applied to said control grid and connections to said apparatus for selecting therefrom electrical energy having a component of said fractional frequency.

10. In a frequency divider, a discharge tube having an anode, a cathode, and a control grid, a source of alternating voltage of a first frequency connected at one terminal to the anode of said tube, series resistance and shunt capacity coupling the other terminal of said source of voltage to the cathode of said tube, a coupling between a point on said network and the control grid of said tube, a condenser in said last coupling, a resistance between the control grid and cathode of said tube, and output connections to said network from which voltages of said fractional frequency may be selected.

11. In a frequency divider, a source of alternating voltages of a first frequency, an inductance and a capacity in parallel tuned to a second frequency which is a fraction of said first frequency, a discharge tube having an anode, a cathode and a control grid, a connection between one terminal of said parallel tuned circuit and the anode of said tube, a connection including said source of alternating voltages of said first frequency between the other terminal of said parallel tuned circuit and the cathode of said tube, an inductance coupled to the inductance of said parallel tuned circuit and connected to the control grid of said tube, the arrangement being such as to apply to the control grid and anode of said tube during operation voltages of said fractional frequency and of opposed phase, and a biasing resistance connected between the control grid and cathode of said tube and operating by grid rectification to build up on said grid an average negative bias which is overcome only by peak voltages of said fractional frequency to produce in said tube currents having a component of said fractional frequency.

12. In a frequency divider, a source of alternating voltages of a first frequency, an inductance and capacity in parallel tuned to a second frequency which is a fraction of said first frequency, an electron discharge tube having an anode, a cathode and a control grid, a connection between one terminal of said source of alternating voltages and the anode of said tube, a connection between the other terminal of said source of alternating voltages and the cathode of said tube, said parallel tuned circuit being in series in said last named connection, a second inductance coupled to the inductance of said parallel tuned circuit and connected between the control grid and cathode of said tube, the arrangement being such as to apply between the control grid and anode of said tube during operation voltages of said fractional frequency and of opposed phase, and a biasing resistance connected between the control grid and cathode of said tube and operating by grid rectification to build up on said grid an average negative bias which is overcome only by peak voltages of said fractional frequency to produce in said tube currents having a component of said fractional frequency.

STUART W. SEELEY.